United States Patent Office
3,158,597
Patented Nov. 24, 1964

3,158,597
REACTIVE AZO DYES
Ulrich Blass and Hans Ischer, Basel, Switzerland, assignors to Sandoz Ltd., Basel, Switzerland
No Drawing. Filed June 21, 1961, Ser. No. 118,543
Claims priority, application Switzerland June 24, 1960
1 Claim. (Cl. 260—199)

This invention delates to water-soluble reactive azo dyes which contain at least one group of the formula -arylene-$(CH_2-NH-CO-R-Hal)_n$     (I)

wherein

R represents a divalent saturated or unsaturated aliphatic radical which may be substituted by halogen and possesses 1 to three carbon atoms, n represents one of the integers 1 and 2, Hal represents chlorine or bromine, and arylene represents an arylene radical of the benzene or naphthalene series which may contain low alkyl or alkoxy groups and in addition halogen atoms and is combined to the N atom of a primary or secondary amine or of a 5-pyrazolone ring.

The process of production consists in treating (A) Water soluble monoazo or disazo dyes having at least one aryl radical of the benzene or naphthalene series which may contain low alkyl or alkoxy groups and in addition halogen atoms and is combined to an N atom of a primary or secondary amine or of a 5-pyrazolone ring, or (B) Organic compounds which contain an aryl radical of this type and one substituent capable of azo dye formation, with reaction products of formaldehyde or compounds which yield formaldehyde on cleavage and amides of low aliphatic saturated or unsaturated halogenocarboxylic acids, and converting the reaction products, when they contain radicals of organic compounds with substituents capable of azo dye formation, into water-soluble azo dyes by suitable reactions, the reactants being so chosen that the group —$CH_2$—NH—CO—R—Hal enters into the aryl radical defined under (A) or (B).

The following are enumerated as examples of aryl radicals which may contain low alkyl or alkoxy groups and in addition halogen atoms and are combined to an N atom of a primary or secondary amine or of a 5-pyrazolone ring.

Phenyl; 2-, 31 and 4-methylphenyl; 2-, 3- and 4-methoxy- or -ethoxyphenyl; 2.4- and 2.5- and 2.6-dimethylphenyl; 2.4.6-trimethylphenyl; 2.4- and 2.5-dimethoxy- or -diethoxyphenyl; 2-chloro-4- or -6-methylphenyl; 2-methoxy-5-methylphenyl; 2-ethoxy-5-methylphenyl; 2-methoxy-4-methylphenyl; 2-methyl-4- or -5-methoxy- or -ethoxyphenyl; 4-chloro-2.5-dimethoxyphenyl- or -diethoxyphenyl; 4-chloro-2-methoxy-5-methylphenyl; naphthyl-(1), naphthyl-(2), 2- and 4-methoxynaphthyl-(1); 2-chloro-4.6-dimethylphenyl-.

Paraformaldehyde and the symmetrical dichloro- and dibromodimethyl ethers are examples of compounds which yield formaldehyde on cleavage.

The reaction products of formaldehyde or formaldehyde yielding compounds and the amides of low molecular aliphatic saturated or unsaturated halogenocarboxylic acids are the N-halogenomethyl and N-hydroxymethyl derivatives and the symmetrical ethers corresponding to the N-hydroxymethyl derivatives. Then can be derived for example from the following carboxylic acids: chloroacetic acid, bromoacetic acid, α-bromo- and α-chloropropionic acid, β-bromo- or β chloropropionic acid, α-bromo- or β-bromobutyric acid, α-chloro- or β-chlorobutyric acid, α,β-dibromopropionic acid, α,β-dichloropropionic acid, α-chloro- or α-bromoacrylic acid etc.

The production of the reactive azo dyes conforming to the invention is carried out by reacting N-halogenomethyl or N-hydroxymethyl derivatives of aliphatic, low molecular carboxylic acid amides which contain an exchangeable halogen atom combined to carbon, such as bromine or chlorine, and if desired other substituents, or the symmetrical ethers corresponding to the N-hydroxymethyl compounds, with water-soluble azo dyes or intermediate products suitable for azo dye synthesis which contain an aryl radical which may possess low alkyl or alkoxy groups and in addition halogen atoms and is combined to an N atom of a primary or secondary amine or of a 5-pyrazolone. The reaction is conducted in concentrated sulfuric acid, preferably of 85–100% strength, or in concentrated phosphoric acid at temperatures between 0° and 30° C., the time of the reaction varying widely up to 50 hours according to the reactants.

Instead of reacting the final azo dyes with the N-halogenomethyl or N-hydroxymethyl compounds on the symmetrical ethers corresponding to the N-hydroxymethyl compounds, the intermediate products used in their synthesis can be reacted and the resulting condensation products converted into water-soluble azo dyes by azo coupling.

Examples of intermediate products which can be used for this purpose are:

2-(2'.4'.6'-trimethyl)-phenylamino-8-hydroxynaphthalene-6-sulfonic acid,
1-(2'.4'-dimethyl)-phenyl-3-methyl-5-pyrazolone,
4-amino-4'-ethoxy-1.1'-diphenylamine-3-sulfonic acid,
4-amino-2'.4'-dimethyl-1.1'-diphenylamine-3-sulfonic acid
and analogous dye intermediates.

The compounds given by the reaction can be precipitated from the sulfuric acid or phosphoric acid solution by the simple addition of water, or if necessary salted out and isolated.

The dyes obtained are used for dyeing, padding or printing, wool, silk, synthetic polyamide fibers, fibers of natural and regenerated cellulose such as cotton, linen, hemp, viscose filament yarn and staple fibers and for dyeing leather in yellow, orange, brown-red or violet shades. The dyeings and prints on wool and synthetic polyamide fibers, which are optionally submitted to a heat treatment in presence of acid binding agents, possess excellent fastness to light and wet treatments (water, washing, perspiration, milling, rubbing and dry cleaning).

The dyeings or prints on cellulosic fibers which are submitted to an alkaline aftertreatment and if necessary to heat treatment during or after dyeing or after padding or printing are very fast to light, washing, water, perspiration, soda boiling and rubbing.

In the following examples the parts and percentages are by weight and the temperatures in degrees centigrade.

*Example 1*

54.1 parts of the red dye obtained by acid coupling of diazotized 1-aminobenzene-2-sulfonic acid with 2-(2'.4'.6'-trimethyl) - phenylamino - 8 - hydroxynaphthalene-6-sulfonic acid, are dissolved with stirring in 300 parts of 96% sulfuric acid at 15–20°. On cooling to 0–5° 25 parts of chloroacetic acid-N-hydroxymethylamide are added in portions and the temperature is increased to 20° in 1 hour. The mass is run onto 1200 parts of ice and stirred until the temperature increases to 10°. The precipitated dye is filtered off, dissolved twice in 2000 parts of water and re-precipitated with 400 parts of common salt. It is filtered, washed with 20% common salt solution, dried with vacuum at room temperature over sulfuric acid, or at 35–40° without siccative. A red dye is obtained which dyes wool and nylon in shades fast to light and wet treatments.

A printing paste is prepared with:

20 parts of the above-described dye,
100 parts of urea,
20 parts of potassium carbonate,
10 parts of sodium 3-nitrobenzene sulfonate,
3 parts of 30% sodium hydroxide solution,
450 parts of 3% sodium alginate thickening,
397 parts of water 1000 parts The paste is printed on mercerized cotton fabric and dried. The print is steamed for 10 minutes at 102–104°, rinsed in cold and warm water, soaped at 100° for 10 minutes in a 0.3% soap solution in distilled water, rinsed again with cold and warm water and dried. The red print is fast to light and wet treatments.

*Example 2*

38.6 parts of the yellow dye, obtained by coupling diazotized 1-aminobenzene-2.5-disulfonic acid with 1-(2'.4'-dimethyl)-phenyl-3-methyl-5-pyrazolone, are added to 220 parts of 96% sulfuric acid at 15–20° with stirring. At 0–5° 13 parts of chloroacetic acid-N-hydroxymethyl-amide are added in portions and the mixture stirred for 2 hours at 25°. It is then poured onto 800 parts of ice, stirred for 10 minutes and the precipitated dye filtered off. The dye is stirred into 1500 parts of water, neutralized with 75 parts of sodium bicarbonate and again filtered off. It is washed with 5% common salt solution and the filter residue dried below 40° with vacuum. The yellow dye which is obtained in good yield dyes wool, silk and synthetic polyamide fibers in shades fast to light, washing and milling.

2 parts of the dye thus obtained are dissolved in 4000 parts of cold water. The solution is heated to 40°, 2 parts of glacial acetic acid and 3 parts of a mixture of a polyoxyethylated fatty amine and an alkylpolyglycol ether are added; then 100 parts of a wool fabric are entered in the bath. The bath is brought to the boil in 15–20 minutes and maintained at the boil for 45–60 minutes. At 85–90° about 5 parts of 5% ammonia or 3 parts of hexamethylenetetramine are added and heating is continued for 20 minutes at 90°. The wool is then rinsed well, with a little acetic acid in one lot of the rinsing water, and dried. A level yellow dyeing fast to washing, perspiration and milling and of good light fastness is obtained.

*Example 3*

52.7 parts of the red dye produced by acid coupling of diazotized 1-aminobenzene-2-sulfonic acid with 2-(2'.4'-dimethyl) - phenylamino - 8 - hydroxynaphthalene - 6-sulfonic acid, are dissolved with stirring in 300 parts of 96% sulfuric acid at 15–20°. The solution is cooled to 0–5° and at this temperature 30 parts of di-(β-chloropropionylaminomethyl) ether are added in portions; the temperature is allowed to increase to 20° in 1 hour; and the whole run onto 1200 parts of ice. After stirring until the temperature increases to 10°, the precipitated dye is filtered off. It is twice dissolved in 2000 parts of water and again precipitated with 400 parts of common salt. It is filtered off, washed with 20% common salt solution and dried with vacuum at room temperature over sulfuric acid, or without a siccative at 35–40°. A red dye is obtained which dyes wool, nylon, cotton, and viscose rayon in shades fast to light and wet treatments.

*Example 4*

35.7 parts of 2-(2'.4'.6'-trimethyl)-phenylamino-8-hydroxynaphthalene-6-sulfonic acid and 25.5 parts of chloroacetic acid N-hydroxymethylamine are added as a powder mixture to 125 parts of 92% sulfuric acid at −15 to −10° and stirred for 3 hours while the temperature is allowed to increase to +15°. The whole is then run onto about 900 parts of ice and stirred for 1 hour, the temperature being maintained below 15°. The precipitated reaction product is filtered off. It is dissolved again in 800 parts of cold water, the solution neutralized at 5–10° with sodium hydroxide solution to pH 6–7, clarified with activated charcoal, and the product salted out with 100 parts of common salt, filtered with suction and dried at 50° with vacuum. The gray powder obtained is coupled in acid medium with diazotized 2-aminobenzene-1-sulfonic acid to give a dye identical with that of Example 1.

*Example 5*

29.2 parts of 3-amino-2'.4'-dimethyl-1.1'-diphenylamine-4-sulfonic acid are dissolved at 10–15° in 250 parts of 96% sulfuric acid. At 0–5° a solution of 12.2 parts of chloroacetamide and 7.5 parts of symmetrical dichlorodimethyl ether in 150 parts of 100% sulfuric acid, which has previously been stirred for 24 hours, is added dropwise. The reaction mixture is stirred for 20 hours at 10–15° and subsequently discharged onto ice to precipitate the reaction product. This is filtered off and stirred into 500 parts of water. The suspension is neutralized with sodium hydroxide solution to a pH value of 5–6, the product again filtered off and dried at 40° with vacuum. It is then diazotized in the normal way at 5–10° with 26–28 parts of 4-N-sodium nitrite solution. A light gray diazo suspension is obtained which is added at 10–15° to a solution of 30 parts of 1-(2'.5'-dichloro)-phenyl-3-methyl-5-pyrazolone-4'-sulfonic acid and 60 parts of sodium bicarbonate in 600 parts of water. The yellow dye thus formed is precipitated during coupling. After stirring for 1 hour it is filtered off and stirred into 1 liter of water. The suspension is adjusted to a pH-value of 5–6 with acetic acid and the dye filtered off. On drying at 40° with vacuum a golden-yellow dye in powder form is obtained which can be dyed on wool from a weakly acetic acid medium and printed on cellulosic fibers with alkaline printing pastes. The dyeings possess good fastness to wet treatments.

When in place of the above-mentioned pyrazolone-sulfonic acid, 29 parts of 1-hydroxynaphthalene-4.6-disulfonic acid are used and the same procedure followed in all other respects, a red dye with similarly good fastness properties is obtained.

*Example 6*

52.5 parts of the orange-colored dye which is obtained by acid coupling of diazotized 1-amino-2-methylsulfonylbenzene and 2-(2'.4'-dimethyl)-phenylamino-5-hydroxynaphthalene-7-sulfonic acid, are stirred with 20 parts of sodium bicarbonate into 500 parts of water. A sulfuric acid solution of the diazo compound, which has been prepared from 17.3 parts of 1-aminobenzene-2-sulfonic acid and 6.9 parts of sodium nitrite, in 200 parts of water, is added. A red-brown dye is formed which is precipitated at 10° with 70 parts of sodium sulfate and 30 parts of 92% sulfuric acid. It is filtered off and pressed in the filter down to a dry content of about 50%. This filter cake is stirred in portions into 250 parts of 96% sulfuric acid at 0° and subsequently 150 parts of 20% oleum are added. The mixture is stirred for 1 hour. Then the following stock solution is added:

A powder mixture of 12.2 parts of chloroacetamide and 6 parts of paraformaldehyde is stirred in small portions into 150 parts of 100% sulfuric acid at 5–10° and stirred for 20 hours without further cooling. In 1 hour at 0–5° this stock solution is added dropwise to the dye solution in sulfuric acid, prepared as above. The reaction mixture is stirred for 20 hours and then run into 2000 parts of ice. The red-brown dye is precipitated, filtered off and stirred into 500 parts of water. Sodium hydroxide solution is added to neutralize to a pH-value of 5–6, then 60 parts of common salt are added and stirred continued for 30 minutes. The precipitated dye is filtered off and dried at 40° with vacuum. It is a brown powder which dissolves in water with brown-red coloration and dyes wool from a weakly and dyebath in red-brown shades.

The following table contains further reactive dyes which are obtainable by the procedures described in Examples 1 to 6. They are characterized by the diazo and coupling componets in columns (I) and (II), the reaction conditions of the azo coupling reaction (column III), the reactive component (column IV) and the shade of the dyeings on wool and on cotton (column V).

| Example No. | Diazo Component (I) | Coupling Component (II) | Coupling Conditions (III) | Reactive Component (IV) | Shade of the Dyeing on Wool or Cotton (V) |
|---|---|---|---|---|---|
| 7 | 2-aminobenzene-1-sulfonic acid | 2-(4'-methyl)-phenylamino-8-hydroxynaphthalene-6-sulfonic acid. | Acid | Chloracetic acid N-chloromethylamide. | Red. |
| 8 | do | 1-(4'-methyl)-phenylamino-8-hydroxynaphthalene-4-sulfonic acid. | Alkaline | Chloracetic acid N-hydroxymethylamid. | Violet. |
| 9 | do | 2-(2'.4'-dimethyl)-phenylamino-5-phenylsulfonyloxynaphthalene-7-sulfonic acid. | Acid | Chloracetic acid N-chloromethylamide. | Orange. |
| 10 | do | 1-(4'-methyl)-phenyl-3-methyl-5-pyrazolone. | Alkaline | do | Yellow. |
| 11 | 2-amino-5-chlorobenzene-1-sulfonic acid. | 2-(2'.4'.6'-trimethyl)-phenylamino-8-hydroxynaphthalene-6-sulfonic acid. | Acid | α-Chloracrylic acid N-chloromethylamide. | Red. |
| 12 | 4-aminobenzene-1-sulfonic acid | do | do | α-β-Dichlorpropionic acid N-chloromethylamide. | Do. |
| 13 | 2-aminobenzene-1-sulfonic acid | 1-(2'-chloro-4'.6'-dimethyl)-phenyl-3-methyl-5-pyrazolone. | Alkaline | Bromacetic acid N-chloromethylamide. | Yellow. |
| 14 | do | 1-(4'-methoxy)-phenyl-3-methyl-5-pyrazolone. | do | Chloroacetic acid N-chloromethylamide. | Do. |
| 15 | do | 2-(2'.4'-dimethyl)-phenylamino-8-hydroxynaphthalene-6-sulfonic acid. | Acid | α-Bromopropionic acid N-chloromethylamide. | Red. |
| 16 | do | do | do | α-Chlorobropionic acid N-chloromethylamide. | Do. |
| 17 | do | 2-(2'.5'-dimethyl)-phenylamino-8-hydroxynapthalene-6-sulfonic acid. | do | do | Do. |
| 18 | 3-aminobenzene-1-sulfonic acid | 1-(2'.4'-dimethyl)-phenylamino-8-hydroxynapthalene-4-sulfonic acid. | do | Chloracetic acid N-hydroxymethylamide. | Violet. |
| 19 | 4-aminobenzene-1,3-disulfonic acid | 1-(4'-methyl)-phenyl-3-methyl-5-pyrazolone. | Alkaline | Di-(β-chloropropionylaminomethyl) ether. | Yellow. |
| 20 | do | 2-(2'.4'.6'-trimethyl)-phenylamino-8-hydroxynaphthalene-6-sulfonic acid. | Acid | α-Bromobutyric acid N-chloromethylamide. | Red. |
| 21 | 2-amino-4-methylsulfonylbenzene-1-sulfonic acid. | do | do | β-Chlorobutyric acid N-chloromethylamide. | Do. |
| 22 | 2-amino-4-methylbenzene-1-sulfonic acid. | do | do | α,β-Dibromopropionic acid N-chloromethylamide. | Do. |
| 23 | 4-amino-2-methyl-1,1'-azobenzene-4'-sulfonic acid. | do | do | α-Bromoacrylic acid N-chloromethylamide. | Violet-red. |
| 24 | 3-aminobenzene-1-sulfonic acid | do | do | α-Chlorobutyric acid N-chloromethylamide. | Red. |
| 25 | 4-amino-1,1'-azobenzene-3,4'-disulfonic acid. | 1-(4'-ethoxy)-phenyl-3-methyl-5-pyrazolone. | Alkaline | Di-(β-bromopropionylaminomethyl) ether. | Yellow. |
| 26 | 2-aminonaphthalene-4,8-disulfonic acid. | 1-naphthyl-(1')-3-methyl-5-pyrazolone. | do | Chloracetic acid N-hydroxymethylamide. | Do. |
| 27 | 2-aminonaphthalene-4,6,8-trisulfonic acid. | 1-naphthyl-(2')-3-methyl-5-pyrazolone. | do | do | Do. |
| 28 | do | 1-(4'-methoxy)-naphthyl-(1')-3-methyl-5-pyrazolone. | do | do | Do. |
| 29 | 4-aminobenzene-1,3-disulfonic acid | 1-(2'-ethoxy)-naphthyl-(1')-3-methyl-5-pyrazolone. | do | α-Chloroacrylic acid N-chloromethylamide. | Do. |
| 30 | 2-aminobenzene-1,4-disulfonic acid | 1-(2'-methoxy)-naphthyl-(1')-3-methyl-5-pyrazolone. | do | Chloracetic acid N-hydroxymethylamide. | Do. |
| 31 | do | 1-(4'-methyl)-phenyl-3-methyl-5-pyrazolone. | do | β-Bromobutyric acid N-chloromethylamide. | Do. |
| 32 | 2-aminobenzene-1-sulfonic acid | 1-(2'.5-dimethyl)-phenyl-3-methyl-5-pyrazolone. | do | α-Chlorobutyric acid N-chloromethylamide. | Do. |
| 33 | do | 1-(4'-methyl)-phenylaminonaphthalene-8-sulfonic acid. | Acid | Chloracetic acid N-hydroxymethylamide. | Red. |
| 34 | do | 2-(4'-methoxy)-phenylamino-5-hydroxynaphthalene-7-sulfonic acid. | do | α,β-Dibromopropionic acid N-chloromethylamide. | Do. |
| 35 | do | 2-(4'-ethoxy)-phenylamino-5-hydroxynaphthalene-7-sulfonic acid. | Alkaline | α,β-Dichloropropionic acid N-chloromethylamide. | Do. |
| 36 | do | 2-(4'-ethoxy)-phenylamino-8-hydroxynaphthalene-6-sulfonic acid. | Acid | Chloracetic acid N-hydroxymethylamide. | Do. |
| 37 | do | 2-(3'-methoxy)-phenylmaino-8-hydroxynaphthalene-6-sulfonic acid. | do | do | Do. |
| 38 | 2-aminonaphthalene-5,7-disulfonic acid. | 2-(2'-methoxy-5'-methyl)-phenylamino-8-hydroxynaphthalene-6-sulfonic acid. | do | do | Do. |
| 39 | 2-aminonaphthalene-6,8-disulfonic acid. | 2-(4'-methoxy)-phenylamino-8-hydroxynaphthalene-6-sulfonic acid. | do | do | Do. |
| 40 | 1-aminonaphthalene-3,6-disulfonic acid. | 2-(3'-ethoxy)-phenylamino-8-hydroxynaphthalene-6-sulfonic acid. | do | do | Do. |
| 41 | 1-aminonaphthalene-4,6-disulfonic acid. | 2-(5'.5-dimethoxy)-phenylamino-8-hydroxynaphthalene-6-sulfonic acid. | do | do | Do. |
| 42 | 1-aminonaphthalene-3,8-disulfonic acid. | 2-(2'.6'-dimethyl)-phenylamino-8-hydroxynaphthalene-6-sulfonic acid. | do | do | Do. |
| 43 | 1-aminonaphthalene-4,8-disulfonic acid. | 1-(2'.4'-dimethoxy)-phenyl-3-methyl-5-pyrazolone. | Alkaline | do | Yellow. |
| 44 | 4-amino-benzene-1,3-disulfonic acid. | 1-(2'.5'-diethoxy)-phenyl-3-methyl-5-pyrazolone. | do | do | Do. |
| 45 | do | 2-(2'.5'-dimethoxy-4'-chloro)-phenylamino-8-hydroxynaphthalene-6-sulfonic acid. | Acid | do | Red. |
| 46 | do | 2-(2'-methyl-4'-ethoxy)-phenylamino-8-hydroxynaphthalene-6-sulfonic acid. | do | do | Do. |
| 47 | do | 1-(2'-chloro-4'-methyl)-phenyl-3-methylpyrazolone. | Alkaline | do | Yellow. |
| 48 | do | 1-(3'-methyl)-phenyl-3-methyl-5-pyrazolone. | do | do | Do. |
| 49 | do | 1-(2'-methoxy-5'-methyl)-phenyl-3-methyl-5-pyrazolone. | do | do | Red. |

| Example No. | Diazo Component (I) | Coupling Component (II) | Coupling Conditions (III) | Reactive Component (IV) | Shade of the Dyeing on Wool or Cotton (V) |
|---|---|---|---|---|---|
| 50 | 2-aminobenzene-1-sulfonic acid | 2-(2'-methoxy-4'-methyl)-phenylamino-8-hydroxynaphthalene-6-sulfonic acid. | Acid | Chloracetic acid N-hydroxymethylamide. | Red. |
| 51 | ___do___ | 2-(2'-methoxy-4'-chloro-5'-methyl)-phenylamino-8-hydroxynaphthalene-6-sulfonic acid. | ___do___ | α-Chloracrylic acid N-chloromethylamide. | Do. |
| 52 | ___do___ | 2-(2'-methyl-5'-ethoxy)-phenylamino-8-hydroxynaphthalene-6-sulfonic acid. | ___do___ | ___do___ | Do. |
| 53 | ___do___ | 2-(2'-ethoxy-5'-methyl)-phenylamino-8-hydroxynaphthalene-6-sulfonic acid. | ___do___ | ___do___ | Do. |
| 54 | 4-aminobenzene-1.3-disulfonic acid | 1-(2',5'-diethoxy-4'-chloro)-phenyl-3-methyl-5-pyrazolone. | Alkaline | Chloracetic acid N-hydroxymethylamide. | Do. |
| 55 | ___do___ | 1-(2',4'-dimethyl)-phenylaminonaphthalene-8-sulfonic acid. | Acid | ___do___ | Do. |
| 56 | 4-amino-2',4'-dimethyl-1.1'-diphenylamine-3-sulfonic acid. | 1-(2'-methyl-6'-chloro)-phenyl-3-methyl-5-pyrazolone-4'-sulfonic acid. | Alkaline | ___do___ | Yellow. |
| 57 | ___do___ | 2-acetylamino-5-hydroxynaphthalene-6-sulfonic acid. | ___do___ | ___do___ | Red. |
| 58 | ___do___ | 1-hydroxynaphthalene-4-sulfonic acid. | ___do___ | α-Chloracrylic acid N-chloromethylamide. | Do. |
| 59 | ___do___ | 1-acetylamino-8-hydroxynaphthalene-3.6-disulfonic acid. | ___do___ | ___do___ | Violet. |
| 60 | ___do___ | ___do___ | ___do___ | α,β-Dichloropropionic acid N-chloromethylamide. | Do. |
| 61 | 4-amino-4'-ethoxy-1.1'-diphenylamine-3-sulfonic acid. | ___do___ | ___do___ | Di-(β-chloropropionylaminomethyl) ether. | Do. |
| 62 | 4-amino-4'-methoxy-1.1'-diphenylamine-3-sulfonic acid. | 1-hydroxynaphthalene-4.6-disulfonic acid. | ___do___ | Chloracetic acid N-hydroxymethylamide. | Red. |
| 63 | ___do___ | 2-hydroxynaphthalene-3.6-disulfonic acid. | ___do___ | ___do___ | Do. |
| 64 | ___do___ | 1-(2',5'-dichloro)-phenyl-3-methyl-5-pyrazolone-4'-sulfonic acid. | ___do___ | ___do___ | Yellow. |
| 65 | ___do___ | 1-phenyl-3-methyl-5-pyrazolone-4'-sulfonic acid. | ___do___ | ___do___ | Do. |
| 66 | 4-amino-2'-methoxy-5'-methyl-1.1'-diphenylamine-3-sulfonic acid. | 2-hydroxynaphthalene-3.6.8-trisulfonic acid. | ___do___ | Bromacetic acid N-hydroxymethylamide. | Red. |
| 67 | ___do___ | 1-phenyl-3-methyl-5-pyrazolone-2',4'-disulfonic acid. | ___do___ | Chloracetic acid N-chloromethylamide. | Yellow. |
| 68 | 4-amino-2',5'-dimethyl-1.1'-diphenylamine-3-sulfonic acid. | 1-phenyl-3-methyl-5-pyrazolone-3'-sulfonic acid. | ___do___ | ___do___ | Do. |
| 69 | ___do___ | 2-propionylamino-8-hydroxynaphthalene-6-sulfonic acid. | ___do___ | α,β-Dichloropropionic acid N-chloromethylamide. | Orange. |
| 70 | 4-amino-2',4',6'-trimethyl-1.1'-diphenylamine-3-sulfonic acid. | 1-propionylamino-8-hydroxynaphthalene-3.6-disulfonic acid. | ___do___ | Chloracetic acid N-hydroxymethylamide. | Red. |
| 71 | ___do___ | 1-phenyl-3-methyl-5-pyrazolone-2',5'-disulfonic acid. | ___do___ | ___do___ | Yellow. |
| 72 | 2-aminobenzene-1-sulfonic acid | 1-(4'-ethyl)-phenyl-3-methyl-5-pyrazolone. | ___do___ | ___do___ | Do. |
| 73 | ___do___ | 2-(3'-ethyl)-phenylamino-8-hydroxynaphthalene-6-sulfonic acid. | Acid | ___do___ | Red. |

The following table contains disazo dyestuffs being characterized by the components A, B, C belonging to the disazo formulae A—N=N—B—N=N—C, the reactive component (IV) and the shade of the dyeing on wool or cotton (V):

| Example No. | A | B | C | Reactive Component (IV) | Shade on wool or cotton (V) |
|---|---|---|---|---|---|
| 74 | 2-(2',4'-dimethyl)-phenylamino-8-hydroxynaphthalene-6-sulfonic acid (coupled in an acid medium). | 4,4'-diamino-3,3'-dimethyl-1.1'-diphenyl-6.6'-disulfonic acid. | Phenol, esterified with 4-methylbenzene-sulfonyl chloride. | Chloracetic acid-N-hydroxymethylamide. | Brown-red. |
| 75 | 2-(2',4',6'-trimethyl) phenylamino-8-hydroxynaphthalene-6-sulfonic acid (coupled in an acid medium). | 4,4'-diamino-1.1'-diphenyl-6.6'-disulfonic acid. | 2-(2',4',6'-trimethyl) phenylamino-8-hydroxy-naphthalene-6-sulfonic acid. | ___do___ | Violet-blue. |
| 76 | 2-(4'-methyl)-phenylamino-8-hydroxynapthalene-6-sulfonic acid (coupled in an acid medium). | 4,4'-diamino-3,3'-dimethyl-1.1'-diphenyl-6.6'-disulfonic acid. | 1-methyl-3-aminobenzene (coupled in an acid medium) and acylated with acetic acid anhydride. | α-Chloracrylic acid-N-chloromethylamide. | Brown-red. |
| 77 | 2-(4'-methyl)-phenylamino-naphthalene-6-sulfonic acid (coupled in an acid medium). | ___do___ | 1-amino-2,5-dimethylbenzene acylated with chloracetic acid chloride. | Chloracetic acid-N-hydroxymethylamide. | Red. |
| 78 | 2-amino-4-chloro-4'-tertiary amyl-1.1'-diphenyl ether (as diazo component). | 1-amino-3-(N-4'-methylphenylsulfonyl)-aminobenzene-6-sulfonic acid (coupled in a weakly alkaline medium and diazotized afterwards). | 2-(2',4'-dimethyl)-phenylamino-8-hydroxynaphthalene-6-sulfonic acid (coupled in an acid medium). | ___do___ | Navy-blue. |
| 79 | 2-amino-4-chloro-4'-tertiary amyl-1.1'-diphenyl ether (as diazo component). | 1-amino-3-(N-4'-methylphenylsulfonyl)-aminobenzene-6-sulfonic acid (coupled in a weakly alkaline medium and diazotized afterwards). | 2-(4'-methyl)-phenylamino-8-hydroxynaphthalene-6-sulfonic acid. | Chloracetic acid-N-hydroxymethylamide. | Do. |
| 80 | ___do___ | 1-amino-3-(N-4'-methylphenyl-sulfony-N-methly)-aminobenzene-6-sulfonic acid (coupled in a weakly alkaline medium and diazotized afterwards). | ___do___ | α-Chloracrylic acid-N-chloromethylamide. | Do. |

Formulae of representative dyes of the foregoing examples are as follows:
Examples 1 and 4:
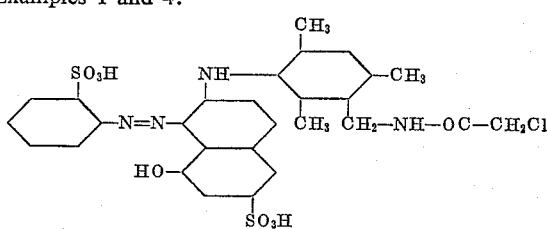
Example 2:
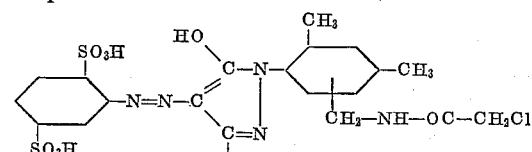
Example 3:
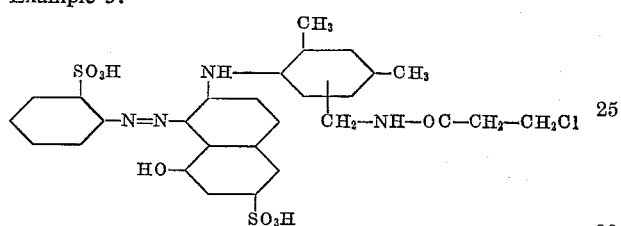
Example 5:
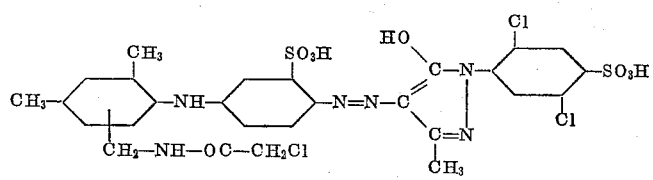
Example 6:
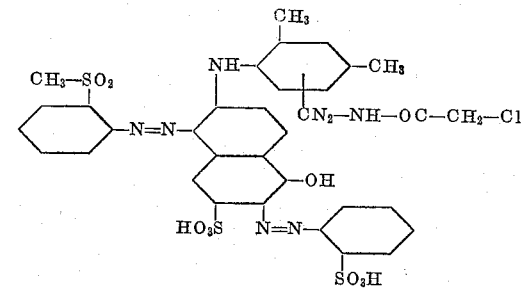
Having thus disclosed the invention what we claim is:
The dye of the formula
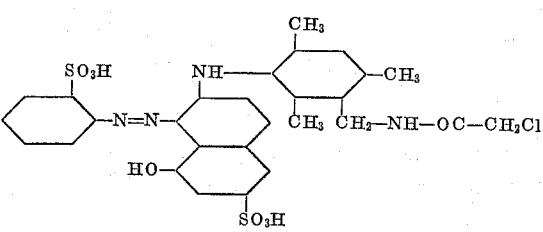
References Cited in the file of this patent
UNITED STATES PATENTS
| | | |
|---|---|---|
| 2,199,048 | Graenacher et al. | Apr. 30, 1940 |
| 2,741,656 | Schmid et al. | Apr. 10, 1956 |
| 2,904,543 | Kappeler et al. | Sept. 15, 1959 |
| 2,975,167 | Schwander et al. | Mar. 14, 1961 |
| 2,993,885 | Fasciati | July 25, 1961 |